United States Patent
Caidar et al.

(10) Patent No.: US 9,386,071 B2
(45) Date of Patent: Jul. 5, 2016

(54) SYSTEM FOR COMMUNICATING MEDIA TO USERS OVER A NETWORK

(71) Applicants: Allon Caidar, San Diego, CA (US); Matthew Babineau, San Diego, CA (US); David Caidar, San Diego, CA (US)

(72) Inventors: Allon Caidar, San Diego, CA (US); Matthew Babineau, San Diego, CA (US); David Caidar, San Diego, CA (US)

(*) Notice: Subject to any disclaimer, the term of this patent is extended or adjusted under 35 U.S.C. 154(b) by 267 days.

(21) Appl. No.: 13/742,078

(22) Filed: Jan. 15, 2013

(65) Prior Publication Data
US 2014/0201327 A1  Jul. 17, 2014

(51) Int. Cl.
G06F 15/16 (2006.01)
H04L 29/08 (2006.01)

(52) U.S. Cl.
CPC .............. *H04L 67/02* (2013.01); *H04L 67/303* (2013.01); *H04L 67/306* (2013.01); *H04L 67/36* (2013.01)

(58) Field of Classification Search
USPC .......................... 709/217, 218, 219, 223, 229
See application file for complete search history.

(56) References Cited

U.S. PATENT DOCUMENTS

| | | | |
|---|---|---|---|
| 2009/0094213 A1* | 4/2009 | Wang | 707/3 |
| 2010/0318976 A1* | 12/2010 | Everly et al. | 717/141 |
| 2011/0022571 A1* | 1/2011 | Snyder | 707/692 |
| 2012/0215846 A1* | 8/2012 | Howes et al. | 709/204 |
| 2013/0031120 A1* | 1/2013 | Passani et al. | 707/758 |

* cited by examiner

*Primary Examiner* — Liangche A Wang
(74) *Attorney, Agent, or Firm* — Donn K. Harms

(57) ABSTRACT

A system of selectively providing media as audio or video or combined media to users in a categorized highly segmented manner. Employing communications and operative software adapted to the task running on a networked computer or server, the system stores media browsers which use media files related to the products and services of one subscribing client. The media browser is forwardable from one user to another. Electronic sales leads are provided to the subscribing clients through the employment of a database configured to discern potential user customers based on matching of media browser identifiers of media browsers requested by users.

3 Claims, 5 Drawing Sheets

SYSTEM FOR COMMUNICATING MEDIA TO USERS OVER A NETWORK

This application claims priority to U.S. Provisional Application Ser. No. 61/532,007 filed on Sep. 7, 2011, and additionally to U.S. patent application Ser. No. 13/296,038 filed on Jan. 7, 2012, and is a Continuation in Part of International Application Number PCT/US12/54327 filed on Sep. 7, 2012, all of which are incorporated herein in their respective entirety by reference thereto.

BACKGROUND OF THE INVENTION

1. Field of the Invention

The present invention relates generally to electronic media such as digital audio and/or video files, for viewing and communication. More particularly it relates to a system and method for disseminating user chosen media files for subscribing clients, over a network such as the internet, through the employment of customized media file-populated individual media browsers. Users become subscribing clients for current and associated individual media browsers upon registration over a network such as the Internet.

In use for commercial purposes such as promotion of products or services, or for non commercial use such as electronic communication and inventorying of collections of media, the system herein provides great utility for maintaining and sending organized collections of media.

Hosted on a network accessible server operated by the system herein, each media browser has or is associated with a unique media browser identifier. The identified media browsers are populated by a known user or a subscribing client, with media files chosen by the subscribing client for association with, and operative play on a local computing device using the media browser, by the subscribing client or a subsequent user to which access to the identifiable media browser is communicated.

Consequently for a commercial concern, such as a furniture store or an electronics manufacturer or a tour operator, each media browser having a unique browser identifier, and populated by the subscribing client, functions to display or play the media files which the subscribing client has chosen to populate thereon. In use for a commercial concern, one or a plurality of media files, specific to or relating to the subscribing client's products or services or other information, are populated to an individual media browser. Access to use the media browser is then communicated to customers or users interested in such.

Thus a furniture retailer may populate individual media browsers with audio and/or video media concerning different types of furniture or interior decorating using their furniture. A tour operator may populate a media browser with media files which depict the sights and sounds of various travel tours, or, a bike manufacturer may wish to populate the media browser with an association to maintenance audio and video media files.

As can be seen, in a commercial mode, each media browser can be populated to containerize and distribute the type and number of media files, which the original subscribing client chooses to group and distribute. Such a system provides small businesses as well as corporate conglomerates a means to provide audio and/or video media to regular and potential new clients and know the recipients will receive the intended media in a manner which will generate or render on the user's individual computing device.

The system herein also has abundant utility in a non commercial manner for categorized orderly inventorying and/or distribution of media files by users who become the subscribing client upon registering with the system. In a similar fashion to a commercial user, such users will obtain communicative access to one or a plurality of media browsers, with each having a unique media browser identifiers. The originating user or subscribing client, has initial administrative rights to populate and change the media files associated with each media browser having unique identifiers. The populated media browser associated with the user-chosen media files, can employ the identified media browser as an electronic container for the populated media files, for communication to friends and relatives and others. Or, they may employ it as an inventorying system for their chosen media files to maintain such in an orderly categorized fashion for later access and play on a local computing device.

In either fashion, the system employs media browsers which employ a unique identifier and act as digital containers for user-chosen media files populated to the unique media browser. When populated by an identified user who upon registering became a subscribing client, the media files chosen by each respective subscribing client for association with a uniquely identified media browser, become grouped files playable on a local computing device communication over a network to access the individual media browser. Access can be limited to a single subscribing client associated with an individual media browser, or can be by third parties who receive access thereto from the subscribing client who populates it, or who leaves access to the individual browsers open to all.

The customized media browsers are enabled with categorized menus for playing, searching out and retrieving and electronically communicating the grouped media files populated thereby by a respective subscribing client, as a user inventorying and playing system, or as a means for communicating the group of populated files for play by third parties. So enabled, the media browser and associated media files thereto may be communicated to requesting users in a packaged or customized digital format which is determined as operatively-employable by the local computing device and the display and sound capabilities of the destination computing device of the remote requesting user.

2. Prior Art

In recent years, the ability of users to communicate over wide area networks such as the internet and receive and display media in the form of electronic files for local reproduction of audio and video has advanced tremendously. In the early years of internet access bandwidth on networks such as the Internet was a major problem for transmission of media to user computers as broadband service was not widely available. Not only did this lack of transmission capability require extensive and time-consuming compression of media files sent from servers, the slow nature of processing and video display upon user computers and transmission rates further inhibited such communication.

An additional problem encountered by users, especially those sharing files, is that media was, and still is, available in many non compatible digital formats. Further, the plurality of available file formats in combination with the many formats for file compression and transmission, has compounded the problem of users receiving media files which are incompatible with their local computing device. More recently, with the logarithmic rise in smart phones which are available from many different manufacturers who use different operating systems, and who provide models with differing processing and video display capabilities, the problem of communicating media files in a manner which insures their playability on arrival, has become ever more complicated.

Because of this compatibility problem for both audio and video files included in the general term used herein as media files, many computing devices from smartphones to desktop computers suffer an inability at times to display a video file or photo, or play audio files retrieved from a website or sent electronically from another user. Over time as operating systems increased and user equipment types changed, a simple video or audio file to be viewed on a user computing device, needed to be available on a server accessed by the user in a high number of digital formats to accommodate the different types of devices and computer operating systems used by users. This is compounded by the different types of viewing systems and software each such user might employ on their respective user computing device.

In recent years, the availability of low cost broadband internet service has become widespread both wired and wireless. Media files which used to take an hour for transmission from a server to a user device, now take minutes or seconds to communicate across the network. With this revolution in cost, transmission capability, and speed, has come a widespread user demand for increased communication of media such as video with audio to be provided in a digital format on an infinite number of subjects.

However, as technology has improved with broadband transmission, so has it improved with user viewing devices. In earlier years file transmission of media was generally a choice between audio and video files capable of user employment on the APPLE or WINDOWS operating systems. With these two operating systems a few types of standardized media playing and displaying software were developed and/or widely user-employed.

In more recent years, with the advent of PDA's, tablet computers, smart phones, game devices, webtops, and other computing devices capable of internet communication and onboard data processing sufficient for media display, another problem has arisen. There are numerous manufacturers providing various component configurations and different operating systems for such game playing devices, smart phones, and PDA's, and other fixed and mobile computing devices.

Along with the numerous operating systems, has arisen numerous applications and programs which render video and sound on the user's device working in concert with the operating system. Thus, whereas encoded video a few years ago might be transmitted slowly to a home computer, using one of two major operating systems, in one or two file formats, today, there are numerous ways the audio and video itself may be digitally stored and played. This has caused the development of a plethora of combinations of operating systems, hardware, and onboard rendering software to which the audio or video media might need to be communicated properly for display and playing.

This ongoing expansion of operating systems, devices, bandwidth, and availability, has created a new problem for companies who benefit from informational and other audio and video advertising media being made available to millions of users connected online. Most users be they retailers and commercial companies or a teenager, are not adept computer programmers as that is not their core business or concern. Users on the other hand are becoming more and more sophisticated about how they access, shop for, and research products and services, and how they store and retrieve media for personal use. Consequently consumer users, with the ability to receive media in the form of audio and video on their local computing device, seek out video and audio information which is playable locally. They do so for personal use in real time or at a future date and in relation to products and services sold by companies.

Companies being adept at retailing and promoting services, have a choice. They must host their own servers which will require storing huge amounts of data and media files, and do so using a high number of differing formats for each such file, for each product and service, in order to try and provide advertising to users with widely varying computing devices, using varying operating systems and rendering software. Alternatively, companies providing desired media to users must sub contract this task to outside firms who may or may not be adept at providing users the proper media in the proper digital format.

Both choices are not desirable in that a company's reputation may be harmed by their inability to provide media from their own server, but it may be equally harmed if a contractor cannot or does not provide such media files in the correct digital format and with any required accompanying digital files to interface on the users computing device. Further, the company selling the products and services must provide the media files needed at a bandwidth which the user's device may employ speedily to render the video locally for viewing, or risk the user moving elsewhere for product and service information.

Users of computing devices from smartphones to tablets to desktop computers also have a dilemma in the retrieval and playing of media. There is not organized system to store and retrieve audio and video files which are found online, sent by friends, or received in a purchase. This results in audio and video files and links being lost and forgotten, or at best hard to find when perhaps thousands of audio and video files and links are available on any individual computing device.

A further problem exists in this dilemma where users handle such media communication and transmission themselves, or have such handled by contractors. There is no standardized uniform manner to offer users vendor-specific content, where users can ascertain by a category what is available from a specific vendor of products and/or services in which the user has interest in acquiring or needs information. Neither is there a manner in which to hereafter choose the media they wish communicated from such a category. Neither is there any universally recognizable format to provide such a categorization system and data file delivery, nor the ability to save and inventory received media files on a new computing device by a new or current user.

Consequently, large and small companies and retailers who are willing to provide consumer users with highly pertinent information about products and services, for sales, service, and the like, are going to great expense to do so with less than stellar results. This is because consumer users visiting each website, must ascertain where the communicable media actually resides, and then tunnel through numerous pages to find it. On each website the process may be different depending upon the initial programming. Further, if a consumer user wishes to share the information found with others, the subsequent consumer must navigate the same process and is not assured that they have the exact media files as the first consumer user who referred them.

For example, a large retailer of home improvement goods displays a website accessible by anyone. Users interested in the firm's products must navigate to the website first, and then ascertain the type of menu and product information provision system the specific website is offering. It is a learning process for each site visited by a user since there is no common format for product and service vendors to offer. If the user finds what they are looking for, and leaves the site, and visit the site again, subsequently, they must hope the site is organized the same, or start the process anew. Should they wish to tell a friend about a discovered product or service, the best they might do is email a link to the site, and if organized to accept it, a link to a spot on the site. However the subsequent user visiting the site may or may not receive the same media files on the same service or product.

Non commercial users of computing devices have a similar communication, retrieval, and inventorying problem for media files. Since users with a specific interest or skill or hobby, tend to know other users with the same interests, they frequently have the same leanings in purchasing products and services, or finding online videos and media for personal use. However, in order to inform another user about a new video found, or a product or service or other information which is available from a company, or on the internet, currently the best a user might do is send a message with a hyperlink to a web page of common interest. The friend, so informed, must repeat the previous user's learning curve on visiting the recommended site and hope they are viewing the same media files as their predecessor. However, neither the receiving friend, nor the communicating user have any organized or categorized means for storing these websites, media files, photos, and other media in a manner where it may be easily found again and retrieved.

If users be they commercial or individuals had a means to provide other users with an easy-to-use system, employing a common format for user information lookup, which standardized both the viewing area and menus, and which also employs software adapted to ascertain the user's device and rendering requirements to deliver the digital media in a proper useable format, both sending users and receiving users would be well served. Users whether inventorying themselves or communicating media to others, would immediately recognize the location of categorized information for the video, place, or company of interest and be able to easily navigate and request the information they require or play the earlier found media.

If such a system employed an electronic container, so to speak, for the grouping and inventorying of information relevant to each respective individual subscribing client, one user instead of forwarding a link to a site, could forward an entire electronic container of media files for the information available from a specific vendor or about a specific subject and containing media files related thereto.

Consequently, such a system would render media inventorying and dissemination from user to an associated user, for information from websites, found video or audio clips, photos, or sales information from individual companies of common interest, easy to accomplish. Further, this standardized electronic container and categorical information delivery system, featuring user assembled media such as audio videos from various electronic sites, or other technical information about individual vendors for products and services in each electronic container or browser, the system would serve to promote vastly increased dissemination of the chosen grouped media from the subscribing client. This is especially true if the system makes it easy for users to retrieve media of interest and to forward such to additional users such as those on social networking programs like FACEBOOK.

As such, in the modern era of the internet and broadband, and social networking amongst users, what is needed is a common recognizable organized system for inventorying and for delivery of media to users, relating to the interest of the subscribing client or sending user. Such a system would allow for the containerized communication of selections of media files from user to user with access to all media files of the assembling user being provided along with a categorized graphical interface to access the media. Thus, groups of songs, or videos, or photos, can be assembled and related to a media browser and sent to friends and relatives for subsequent enjoyment and use.

For commercial use, individual respective companies and providers of services and products, and related to information in general for which users desire media files.

Such a system should employ an electronic packaging or relationship of files such as a browser or an electronic packaging of the respective sender or originating user or seller's media files, or other related digital media files, in a grouped or categorized fashion of related files. Such a system should allow users to choose the media they wish communicated and thereafter package the digital media files, communicate such to others and know the subsequent recipient will be able to play the media in a format employable on the individual destination device employed by the user.

Still further, in relation to product and service promotion, such a system should be useable at kiosks or on user smart phones and devices in or near the subscribing client's stores, or online. Additionally, such a system should enable the media forwarded to a first user in proper format and with associated codecs and drivers, to be forwarded by that user, to a subsequent user. The system when forwarding the digital media files to any subsequent user will adapt the contents communicable to the subsequent user with the container, with files, drivers, and codecs if required, for employment on that respective subsequent user's computing device.

Still further, in furtherance of downstream or continued user-device compatibility, such a system should employ an interface, which during the start of a user session or login on a current or new computing device, ascertains a unique identifier for the user, the user's computing device, and the media browser or containers being used by the identified user. Further the system should ascertain the type of media browser being employed by the respective user, and the electronic digital file requirements for the discerned browser as required for the current user computing device, to render the media useable by the current user's device.

Once so discerned, the user's computer device is assigned a local computing device identifier, or access point identifier, on which the uniquely identified browser and/or file container reside. Thereafter the system maintains a database of identifiers which relate the media browser identifier and the computer device specific configuration for playing media files and file requirements for future transmission to the specific device. Further, the system should employ a browser or file container, which if access thereto is forwarded to a subsequent user, is adapted with polling software adapted to the task to re-ascertain the local machine requirements for communicated media, assign the new machine a unique identifier for that user device in the system, and subsequently communicate digital files packaged to properly render on the subsequent computer system or access point, at the location of the uniquely identified browser or file container.

Still further, such a system should allow users who employ the media browser or file container on their local device, to employ it for inventorying and to catagorize and group new media files as they are downloaded, and thereby maintain the employed database of such files in groups of one or a plurality of digital media and software files related to subjects or otherwise categorized on their local machine. Additionally, such users should be able to send access to the entire media browser or electronic container with its unique browser identifier, from their device to other users, or, allow such users to send categorized sections to other users for use on their browsers which will be provided to the subsequent users in a file format and with all associated files to render and play the sent media on their local machine.

Additionally, such a system in a commercial setting should allow a company to populate and distribute access to electronic media browsers which act as containers for the categorized information using unique identifiers, or to subcontract the task and always have a uniform manner of delivery to users requesting information, so they may easily find the media they require if it is available.

Still further, using the unique local computing device identifier on which the uniquely identified media browser with grouped associated files is hosted, such a system will endeavor to maintain the database of all such unique user identifiers, user computing device identifiers, media browser identifiers, and the user computer device configuration of local display and audio file requirements, and to thereafter communicate future media files to such respective user devices, in the proper file format and in the grouped file package containing all files, drivers, codecs, or other software required, to employ requested media files on that local device.

An object of the present invention is to provide a media browser system to receive, send, and inventory media files and information, in a manner which is categorically relevant to each subscribing client's interests, or products and services in a manner containerized to operate on an identified local device for the user.

It is another object of the invention to electronically host, or provide communication with such files and information in a manner which would be detectable by conventional standards of internet search engines so users seeking the information contained therein, may find it using such search engines which would provide links to the appropriate container of categorized information relevant to their search.

It is another object of the invention, to provide such media browsers as electronic containers for media files with unique browser identifiers, which will continue to access and/or store media files in the future which can be provided in proper format and with required files and software to render the media files on the local computing device using the unique machine identifier, and browser identifier, in a database.

It is a further object of the invention to provide such a system, where a first uniquely identified user receiving such a uniquely identified media browser or electronic file container for use on their local machine, can use it personally as an inventorying system, or can forward access to the media browser by email or on a network to subsequent users, who will receive a unique user identifier along with their computing device identifier, and who will subsequently receive such files and software in a fashion adapted for use on their local machine, irrespective of how such was delivered to the prior user.

SUMMARY OF THE INVENTION

The present invention provides a system and apparatus for the storage, inventorying, organized offering, and communication of media files in the form of video files, and/or audio files, and required software files to render them on a user computing device, to desiring users on a network such as the internet. The system provides for a standardization of storage and association of the available media audio and sound files in a manner allowing for specific interests of a single user, or for organized grouping of products from a system subscriber who sells products or services or a particular business or website.

This standardization and file grouping is accomplished using a uniquely identified software-operated virtual electronic containerization or media browser system, which enables access to populated media files for graphically depicted viewing and listening, for or to uniquely identified users. Access to the media files populated to a media browser will be provided by the system herein over a network such as the internet along with proper files required for local viewing on a user computing device. Further the media browser system provides a concurrent common or a standardized manner of providing users a categorized menu for inventorying, disseminating, and storage of available media files.

The media browser when populated with media files functions as an electronic container which has a unique browser identifier related to a subscribing client's media files, photos, audio files, or in the commercial use media regarding products or services or information. The media player is employable on any type of media device be it a smart phone, laptop, pad computer, or desktop, or the like. It is employable by a user on kiosks, on a user's own computing device, or over the internet.

The system using identifiable media players can also be employed using a service for communicating media files to a media player requesting them, or a cloud-based file system to request and transport one or a plurality of digital media files concerning a user's interests, a manufacturer product, or a retailers service, or subject or website or video of interest to the user populating a media browser. In on manner of employment, users who are uniquely identified, can simply request a media player populated with information on a subject, and have all required digital files to play such media on a local uniquely identified computing device, communicated to that device.

Universal distribution is insured since computing devices communicating on the system, are polled and provided with a system identifier of the computing device and its ascertained electronic configuration, the digital files communicated to the user computing device will be in a format and with any associated digital files or drivers, required to render the media on that local device.

The media browser acts as an electronic container and common media browser when employed on a local computing device, or it may function as an electronic container or bucket for all of the media populated thereto by a user, regarding one or a plurality of subjects, or regarding a specific vendor of products and/or services, or websites or other media a populating user wishes to send on a subject matter of interest to the downstream or requesting user. For instance, a user interested in a number of bands and their different types of music, can employ the media browser to inventory access to such on their local computing device by populating a uniquely identified media browser with the locations of media files. The system thereafter will act to communicate the required files to match the chosen media from the graphic interface of the media browser.

If used commercially, different vendors, websites, or locations, can maintain individual uniquely identified media browsers or electronic containers on their local computing devices for each respective site or provider. Alternatively, the user can have a single browser or electronic container, which will have the ability to store and maintain categorized listings of stored media on the local machine.

Because each media browser or electronic file container has a unique browser identifier, which is related in the network accessible database operated by the service operator with the required group of media files populated to the media browser by the original user or subscribing client, and because the system maintains if possible a unique computing device identifier of the local machine using he media browser and its configuration, users of the populated media browser are assured that digital media files provided thereto will include the digital files required in the proper format as well as any software, codecs, or other files required on the local machine.

While in one mode of the system, a single media browser might provide and maintain categorized media menus for media from multiple websites, video sites, musical sites, or product and service vendors, if such is populated to the individual media browser by the first user, it is preferred to communicate each uniquely identified browser to uniquely identified users, in a more organized fashion. In such an organized mode, the identified media browser is populated with the media files which are specific to the desire of a particular user authoring the media browser. Such for example may be rock music, vacation tours, vendors of products or services of common interest, or other media one user wishes to organize and provide access to for other users.

The specificity provided by multiple individual identifiable browsers or containers, which can function as desktop icons may be preferable. First is the lack of computer operation sophistication of users. Many users are incapable of adapting software or files communicated for playing on a local software media browser to different situations, or unable to easily ascertain menu functions. Further a majority of computer users are not well versed in configuring the software on their local machine to play media, especially if the communicated digital files require configuration changes by a user.

By distributing media browsers with unique identifiers populated with access to media files specific to that desired by a particular sending user, relative, or vendor, access to the populated digital media files are provided to a receiving computing device in a manner calculated by the software, to be employable on the uniquely identified local computing device. This is because the receiving user will know the icons representing any of the media browsers or file containers and their respective menus, will provide organized access to all of the grouped files which are specific to the music, video, information, products and/or services and/or other information populated by an originating user or subscribing client.

Secondly, by rendering the browsers with electronically containerized grouped media files populated to the media browser, and with onboard categorized standardized menus, and by assigning a unique browser identifier to each browser, when access to a media browser is moved to a new local computing device, it renders the media browsers themselves with the files associated and populated to the browser with the unique browser identifier, to be transportable and forwardable as an executable unit over the internet.

Thus this population and file inclusion system encourages individual users who know other users with similar interests, to communicate to subsequent users the media browser which the first user has populated or received, which has the browser identifier thereon. The system recognizing the identifier and knowing the associated populated media files, will communicate the media to other users which is specific to the subject, video, audio, vendor, website, seller, or any other common interest which was employed by the populating user. The populating or downloading first user so communicating with others, knows their downstream friend will be getting relevant information in a standardized format with all communication to the populated media files provided by the system herein. Further, both receiving users and sending users will be assured that they are not communicating junk mail, or scams or media files which contain information in which their friends would lack interest.

Further, to business subscribing clients to the service, such as retail product sellers, manufacturers, and service providers, and even for non professional individual users, a media browser populated to render and only offer media concerning a designated subject, product, or service, etc. based on the media browser having a related browser identifier, insures no other media files are included or added into the packaged media files sent within the browser, unless the populating user authorizes such.

Standardization and limiting viewable media on each identified browser, to the media files populated thereto, in the field of commercial advertising, has other benefits in the area of data/metrics. Currently one manner of providing vendors with leads for customers employs a tracking of the web surfing habits of individual users who are identified by the machine they are using primarily. The information provided is based on categorizing a tracked user's video viewing habits at numerous sites of numerous interests and by interest/genre/etc.

Conventional sellers of user locations and electronic addresses for popup and pushed advertising is based primarily on what sites a discerned user visits and not what the user does there. Rather than discerning potential customers for products and services for vendors based on a user's tracked web surfing habits and patterns, the system herein allows the system operator to tell advertisers what video a uniquely identified user watched, and what specific subject and media were included in requested and related uniquely identified media browsers. This is a technique which yields relational data on internet users which is much more accurate as to what a user is currently considering for purchase than just guessing based on website visits. Consequently, such information is valuable when subsequently determining which vendor video ad to serve up or popup on the screen of such a user.

The system herein achieves this unique and more accurate customer profile because the system operator communicates the various uniquely identified media browsers with categorized information related thereto, to each uniquely identified user. Thus, data can be collected as to exactly what media is being requested by the individual users, and viewed on the media browsers. Further, in addition to tracking each requested media browser and relating it, or a group of browsers, to a specific user in a database, optionally the system herein may employ specific media browser-based cookies to communicate to the system operator if a unique user was on a specific browser.

For example the communicated cookie could provide information that a user who viewed browser X was also on browsers Y, Z, C, and D. Therefore potential advertisers can be sold information on what specific users like to watch on video when they are online, or what media they are requesting, and not just which website they may or may not have visited.

With respect to the above description, before explaining at least one preferred embodiment of the herein disclosed invention in detail, it is to be understood that the invention is not limited in its application to the details of construction and to the arrangement of the steps in the following description or illustrated in the drawings. The invention herein described is capable of other embodiments and of being practiced and carried out in various ways which will become obvious to those skilled in the art on reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other electronic and software-enabled media browser related distribution and methods and systems for carrying out the several purposes of the present disclosed system. It is important, therefore, that the claims be regarded as including such equivalent construction and methodology insofar as they do not depart from the spirit and scope of the present invention.

As used in the claims and in the specification herein to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of the invention to provide a web-based provision of media and other files, in grouped digital files, populated by a first user or subscribing clients, to identified users communicating or having an interest in the respective populating user's interests or a subscribing client's products or services.

It is another object to provide such media to users along with a software media browser adapted to play the media on the respective user's display on a local user computing device whether housed there or on a networked server.

It is yet another object of this invention to provide such media dissemination for populating users and subscribing clients, in a fashion which also includes all required digital files grouped and categorized menus for playable media thereby improving ease of section of the desired media by the remote user.

Yet an additional object of the present invention is the provision of a plurality of individual increments of media and information, from one user to another, in a categorized fashion relating to a populating user's interests or commercially a subscribing client's products or services or information, in a manner easily discoverable by conventional search engines.

It is a further object of this invention, to improve data metrics using the uniquely identified media browsers and containers, and their relation to uniquely designated media files, and to the uniquely identified users 26 requesting them.

Yet another object of the invention, is the population to a media browser by a first user related to a uniquely identified browser or container, which itself may be forwarded to subsequent users along with the media files also.

Further objectives of this invention will be brought out in the following part of the specification wherein detailed description is for the purpose of fully disclosing the invention without placing limitations thereon.

BRIEF DESCRIPTION OF DRAWING FIGURES

FIG. 1 is a block diagram of the disclosed system for organizing and communicating media such as video and audio to in populated media browsers employable by users in accordance with one embodiment of the present invention.

FIG. 2. depicts a graphic rendering of a typical media browser's screen, and one means for ascertaining if an identified browser has been syndicated to a subsequent machine and the potential that a capability inventory of the subsequent machine may be employed.

Figure 1:
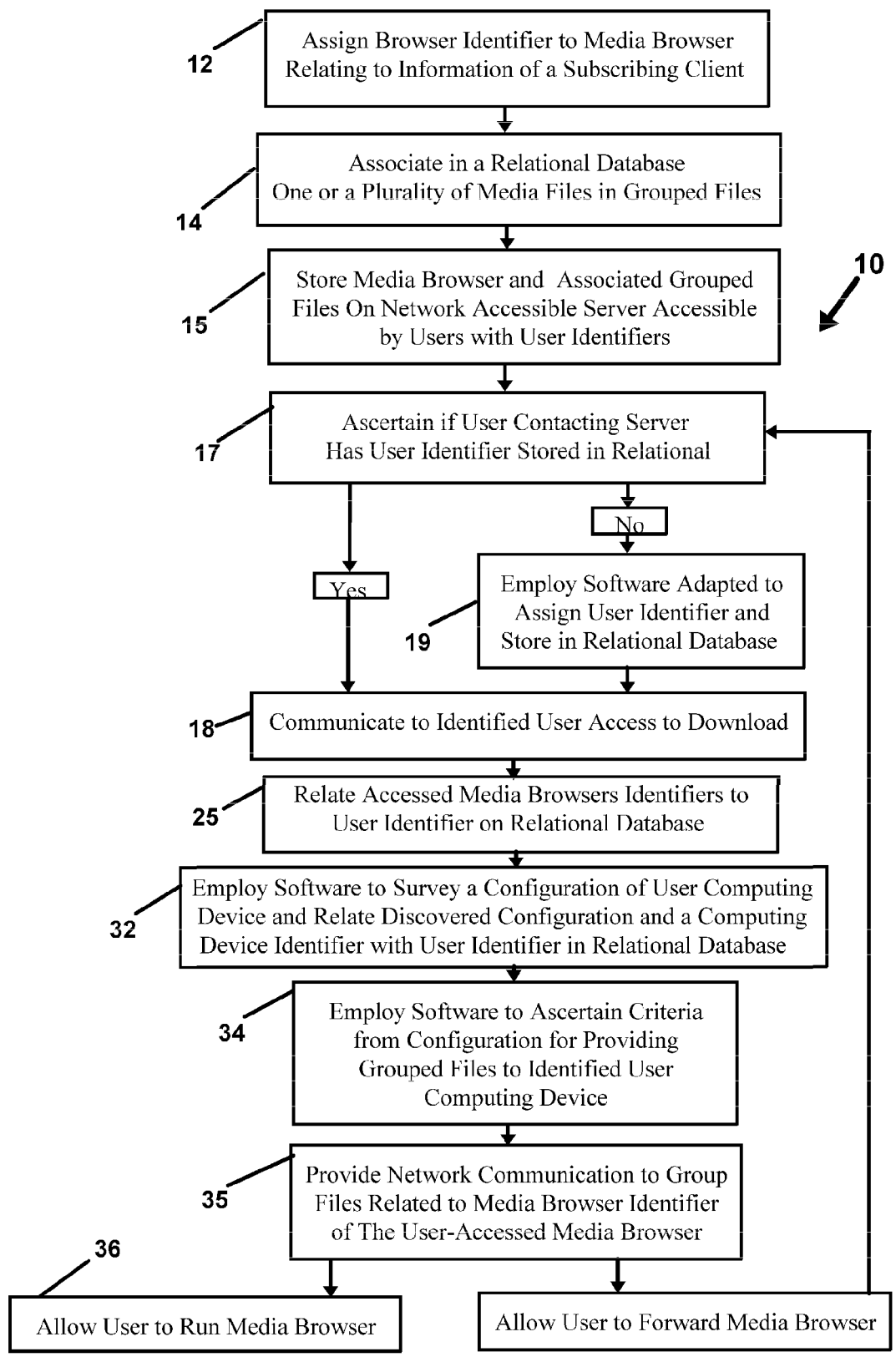

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, any directional prepositions such as up, upwardly, down, downwardly, front, back, top, upper, bottom, lower, left, right and other such terms refer to the device or depictions as such may be oriented are describing such as it appears in the drawings and are used for convenience only. Such terms of direction and location are not intended to be limiting or to imply that the device or method herein has to be used or positioned with graphics in any particular orientation. Further computer and network terms such as network, database, browser, media, digital files, and other terms are for descriptive purposes only, and should not be considered limiting, due to the wide variance in the art as to such terms depending on which practitioner is employing them. The system herein should be considered to include any and all manner of software, firmware, operating systems, executable programs, files and file formats, databases, computer languages and the like, as would occur to one skilled in the art in any manner as they would be described.

Now referring to drawings in FIGS. 1-10, wherein similar components are identified by like reference numerals, there is shown a block diagram, figures substantially representative of the operation of the disclosed system 10 for communicating media, such as digital video and audio in digital files, to preferably uniquely identified users 26, in accordance with the primary objectives of the present invention. Those skilled in the art will realize that the order may be changed, rearranged, or other steps inserted and the system 10 and it will still provide a substantial improvement to the communication of media files, to users 26, in populated media players using grouped files 29, determined to be employable on the destination computing device 24, based on its computing and display configuration 32. Each media browser 16 is populated with media files for specific subject matter or information by a registered user who becomes a subscribing client 27, and is displayable with a graphic interface of the populated files and subjects in a categorized fashion.

In operation, for respective media populated to the identifiable media browser, for example videos, audio files, pictures, subjects, products, services, or information populated to an individual media browser 16 by any originating registered user or subscribing client 27, for communicating such to media receiving users 26 to the system 10, the system 10 in a first step 12 associates a browser identifier 30 with respective media browsers 16 which relate to the originating user populating the media files or any other files to the media player, herein termed the subscribing client 27. Populated files can include one or a combination of web locations, video files, audio files, photos, informational material on products and services, or other information such as manuals, specifications, instructions, communications, and the like. An association 22 in the database is made between the browser identifier 30 and media browser 16 and the one or plurality of grouped media files 29 populated to the media browser 16, by the originating user or subscribing client 27 which relate to the information the subscribing client wished populated and related to the media browser 16 having that identifier 30 on the system 10.

With the media browsers 16, browser identifiers 30, and grouped media files 29 properly related in the database of the system 10, with each other, and their respective subscribing client 27, the media browsers 16 and grouped media files 29 are placed on a networked server or the like, and made available 15 for access by users 26. In operation, users 26 attempting communication with the server, pass through an interface with software adapted to the task of ascertaining 17 if the user 26 has a user identifier 21 in the system 10 stored in the database or recognized. If the user 26 already has a user identifier 21 a communication 18 is provided to the user 26 allowing access to communicate with or download a media browser 16 and/or access to or communication with the grouped files 29 populated to and relating to a media browser 16. If the user 26 does not have an identifier 21, then software adapted to the task, takes input of the user information assigns 19 the user, a user identifier 21 and the communication 18 for access to the server is provided the user 26.

One or a plurality of digital files in grouped files 29, relating solely to the files populated to the media browser 16 by the subscribing client 27, for example videos, photos, audio files, websites, webpages, products or services or information or other subjects of interest of the populating user or each respective subscribing client 27, is related to each respective media browser 16, which itself has a unique media browser identifier 30. The browser identifier 30 used by the database to discern the proper grouped files 29 to be associated therewith based on the original population to the media browser 16. A user 26 requesting access to use a media browser 16 or the grouped files 29 related to it, will interface with software communicating with the server 34 and if they have a user identifier 21 determined already in the database 23, the users 26 are communicated 18 a manner of access or download or other networked manner to obtain a communication of required media browser 16 and/or related grouped files 29.

During or after requests from users 26 for files, a relation 25 a relation is ascertained where the user identifier 21 is stored in the database 23 and related to all media browsers 16 and/or all the grouped files 29 to which they request access. This data may be employed later to provide users 26 related information to something they have requested, and client subscribers 27 such as commercial users, or others, information on potential user customers.

The individual media files of the grouped files 29 may be stored on the system server 34 and later requested and/or placed in communication to a user, by user receipt and/or activation of a media browser 16, or, the files may be stored in cloud server to which a download or proxy link is provided, or for which the system serves as a proxy server or other network link, whereby the grouped files 29 for the media relating to a particular media browser identifier 30 are communicated to users 26 when needed.

A computing device configuration 32 is determined by software adapted to the task and attached to, or working in concert with, the media browser 16 by conventional means of polling or inspecting a computing device for the operating system, and the data processing and audio and display device components, of the user computing device 24, on which the media browser 16 is to be employed.

Thereafter the system employs software adapted to make a determination 34 of the proper number, type, format, and grouping of the digital files, and any codecs or other files which must be included in grouped files 29 which are provided according the original population and related to a media browser identifier 30, which are determined to be software code-adapted for employment by the media browser 16 using the data processing and audio and display device or configuration 32 of the user computing device 24, on which the media browser 16 is to be employed. This determination 34 forms a configuration 32 which along with an assigned computer device identifier 31, is stored in the database 23 and related to the user identifier.

Once the machine identifier 31 is related to a configuration 32, software adapted to the task, will make available 35 on a server or other means for access, the grouped files 29, and endeavor to electronically containerize the correct populated file members of the grouped files 29 for use with a populated media browser 16, based on its identifier 30, or made accessible to the media browser 16. Unless subsequent users are given administrative rights, the grouped fields 29 concerning the original populating of the media browser 16, will be solely employable on the identified media browser 16. Alternatively the system 10 can provide a user activated link to a download or a streaming of categorized grouped files 29 which are pre determined to be employable on the computing device 24 occupied by the media browser 16.

As noted, a routine of the media browser 16 software adapted to the task and working with it, ascertains the destination device 24 capability for playing the media files by reviewing one or a combination of criteria including the operating system, processing capability, video display and audio reproduction, to determine the configuration 32 and thus the user computing device media playing ability. This operation provides means to discern the file format and types of files in the grouped files 29 to be sent to the user computing device 24, for operative employment thereon. This configuration 32 and the user computing device identifier 31 assigned in the process of determining the configuration 32, is thereafter stored in the database 23, and related to the user 26, for any future requests for media browsers 16 or grouped files 29 for a media browser 16 operating on the computing device having the identifier 31. The identifier 31 can be determined during a communication with the server using readable components of the computing device 24 such as the Mac ID, or it may be imparted to the media browser 16 to report during initial and subsequent communications.

In either manner, each respective media-providing subscribing client's 27 populated media provided by the grouped media files 29, categorized by subject with a graphic interface of category identifiers, are provided to a requesting identified user 26 and thereafter preferably displayable by category on a menu page of the media browser 16, in a graphic interface chooseable fashion. So communicated, the user 26 requesting the information and media browser 16, may easily find and use the populated media files which the subscribing client intended or relate to their desire or inquiry for information about products, services, or other information concerning a specific subscribing client 27. Only grouped files 29 related in the database as populated to the media browser with the respective browser identifier 30 will be communicated to a user with access to a respective media browser 16 requesting such.

The media browser 16 can provide an excellent means for a user 26 to inventory media files on their own computing device as they find them or as they are sent electronically. Using the media browser 16 on a local device, a communicable file categorization is discernable on the user's computing device display, such as shown in FIGS. 4-6 and 8-10, by the user 26 by viewing a graphic display area shown as virtual display screen 18 figures in 8-10. As depicted therein, there is indica 20 including one or a combination of text, illustrations, graphics, photos or other displayable indicia which is discernible by a user 26 as designating chooseable channels 41 or categories 43. Such are chooseable using a conventional curser 45 and input component such as a mouse, for a display of the underlying media files related to chosen categories. Users 26 can thus employ a media browser 16 to maintain an inventory on their computing device of media they wish to maintain and easily find and access it using the graphic interface.

Additionally, the media browsers 16 which are made available for download, as well as the server 34 providing access to them, also can employ metadata and other content markers recognizable by search engines or crawler software, as a means for enabling conventional search engines to identify and thereafter ascertain the categories and subject matter contained or related with any respective browser 16. The meta data can provide information by category and media files available in such categories or combinations thereof and may contain hypertext allowing direct links to view or download said media files.

Each media file made available to an identified user 26, based on the unique browser identifier 30 of the media browser 16, is made available as one or a plurality of computer files in the accessible grouped files 29 made concurrently available. The grouped files 29 associated with the browser identifier 30 are made available for operative communication over the network on a server or elsewhere. As noted, only the individual populated files which are members of grouped files 29 which are specifically related to a uniquely identified media browser identifier 30 running on a user computer device 24, can be sent or communicated for play on the respective media browser 16 where it is to be operatively employed. This provides a means to insure that if access to the media browser 16 is sent to a subsequent user by email or otherwise, that they too will see and/or hear the exact media populated by a prior user or client subscriber since the same grouped files 29 will be associated therewith by the system 10 to accomplish such.

Additionally, the system 10 herein can incorporate into the software of the media browser 16, a reference to the original "source" of the media browser 16 which will provide a beacon to the source to the grouped files 29. This will alleviate the need for subsequent users to search for grouped files 29 or other media files needed to run the media browser 16 by providing an integrated referral system for the computer devices of subsequent users to automatically discern the location of a server hosting the grouped files 29 if they are not containerized with the media browser 16.

The grouped files 29 can be accessed or otherwise communicated as a plurality in digital file containers or put in communication with the related identified media browsers 16, which is enabled with or employed in concert with software adapted to the task of identifying the receiving computing device 24, in a manner specific to that individual computing device 24 and ascertaining its discerned configuration 32. In this fashion the populated media of the grouped files 29 relating to the browser identifier 30 of the media browser 16 of a populating user such as the subscribing client 27, which are stored in an accessible fashion on an internet-connected server 34 may be communicated to the media browser 16 and a first, second, or thousandth computing device 24 that receives the media browser 16 from another user 26. Also in conjunction with the storage on a server, metadata can be included to allow search engines to easily find the media browsers 16 stored on a server 34 and the categorized files and information related to each.

As noted, the originating populating user or subscribing client provider of the media browsers 16, have unique media browser identifiers 30 storable in the database 23 for association with appropriate grouped files 29 for the media populated and associated to the subscriber client 27, and its respective media browser 16, which are made available for use and/or download and use by identified users 26. The users 26 are uniquely identified with their user identifier 21 using software adapted to the task interfacing with the user 26 and the server 34, when requesting access to such media browsers 16 after finding them on a search engine search, or, after visiting the subscribing client 27 or provider's website. As noted, the term media browser 16 is not to be limiting herein but to be considered any software routine or program or electronic container or file association operation which provides access to, or a download of, media files populated to and associated with the media browser by an originating user or subscriber client. Herein the population of the browser for media files and solely grouped files 29 which have been associated to the media browser's unique media browser identifier 30, are provided for access by users 26 running media browser 16, on their computing device.

Commercially, alternately, the electronic containers or media browsers 16 and/or having identifiers associated grouped media files 29, can be loaded to the subscribing client's server 34 for user computing device 24 access, or communicated to in-store kiosks or video displays which are operatively engaged to a data processor and means for network electronic communications. These in-store venues will be accessible by users 26 on-site where the user 26 may immediately view the content related to a chosen media browser 16, or may request an electronic forwarding of the media browser 16 which will include access to or communication of the grouped files 29, to their chosen email or electronic destination for later viewing, or both.

Also, the digital media files of the specific grouped files 29 populated and associated with a specific media browser identifier 30, relating to those populated by a specific subscribing client 27 or originating user, can be stored in a cloud server or third party accessible server and made available to the individual media browser 16 when needed. This allows the media browser 16 to be communicated for running on the identified user computer or access point, and a streaming or other communication of the related media files as needed.

Once the media browsers 16 which contain or have identifiers 30 associated with and linked to the associated grouped media files 29 relating to media files populated thereto by an originating user or subscribing client 27, are made available for requesting users 26 according to their user identifier 21, and an identified user requests such, through a hypertext or hot link or other means of electronic designation, the access to the media browser 16 desired by the requesting user 26 is communicated to the user 26 electronically. Thereafter, the downstream user 26 may choose how they access the media browser 16 in their choice of browsers 16, by accessing the media browser 16 in combination with or with links to cloud stored and/or associated grouped files 29 populated originally therewith, and/or, by allowing the user 26 to remotely run the media browser 16 virtually through a link from the user's computing device or access point, to the server 34 hosting it. Or, as noted above through kiosks or a wifi node on site and linking to requesting user computing devices 24 such as smart phones at on-site venues and/or email or other electronic communication to a user-designated electronic destination.

The media browser 16 access communicated to the requesting user 26 in each case, with the assigned the browser identifier 30 which may thereafter be ascertained by software operating on the system. The browser identifiers 30 for the browsers assigned are unique and associated by the database solely with the grouped files 29 of media for the media browser of the subscriber client's 27 products, services, or information. The sent media browser 16 of each requesting identified user 26 and any grouped files 29, and the computing device identifier 31, and any identified computing device 24, ascertained by the software adapted to the task will be associated in the database 23, with the user identifier 21 requesting it.

In operation, once the media browser 16 with assigned the browser identifier 30 is either downloaded, forwarded to a user-chosen electronic destination, or remotely operated by the user 26 on the local computing device 24, software adapted to the task identifies the media playing capabilities, or configuration 32, of the user's local computing device 31. As noted, such software would inventory the software-discerned media display and audio playback capabilities, based on the identified electronic components and/or operating system of the local computing device 31. These local machine media playing capabilities or configuration 32 are then communicated to a networked server 34 hosting the communicated files.

Figure 5:
FIG. 5 depicts an example of an icon miniaturized version of a media browser or file container employable on a desktop for activation by a mouse and curser.
Figure 6:
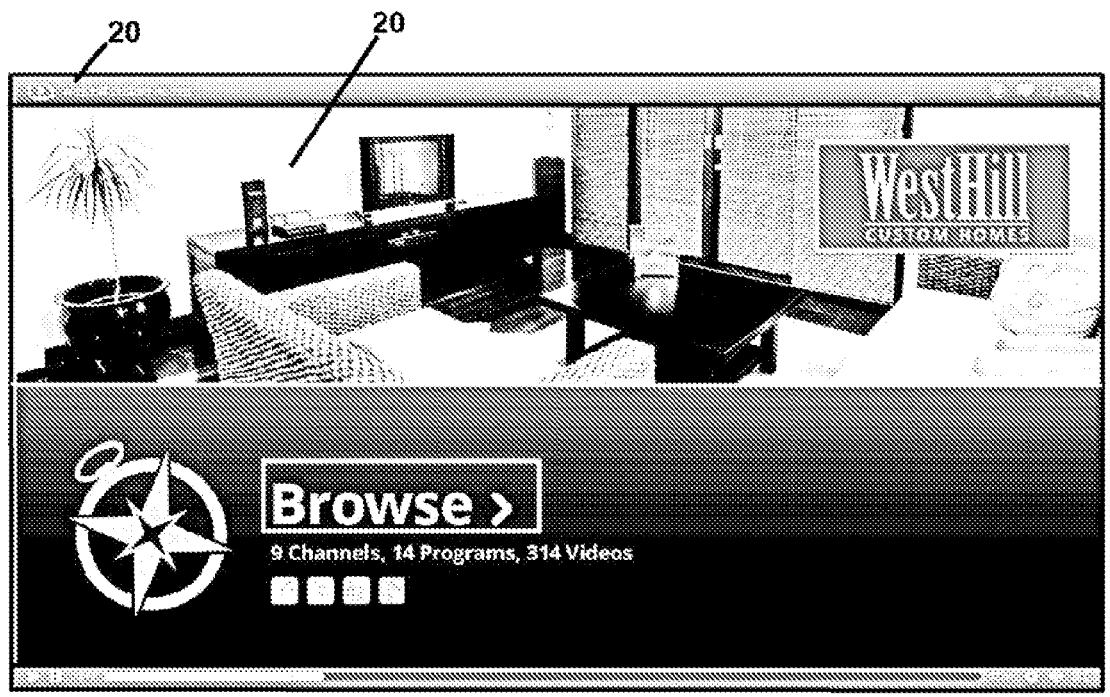
FIG. 6 depicts a mode of the main page of the media browser or media showing the user a listing of the chooseable category channels for media populated and associated to the browser and depicting the number of media programs and viewable.
Figure 7:
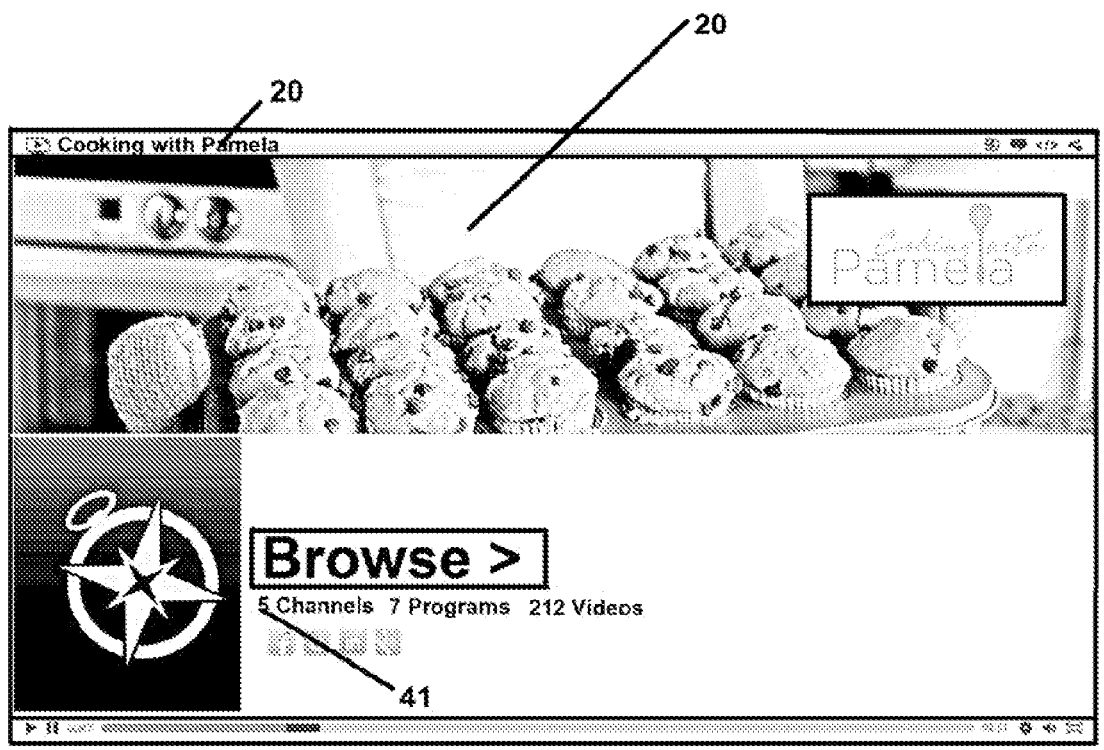
FIG. 7 depicts a mode of the main page of the browser as in FIG. 6, showing user chooseable channels which may be initiated using a cursor and designation device such as a mouse.
Figure 8:
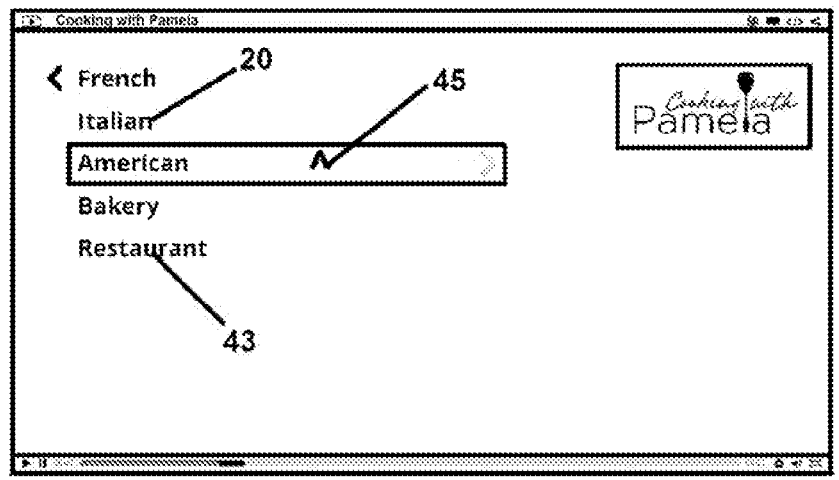
FIG. 8 depicts a graphic interface sub menu showing the listing of 5 channels which in this case is language categorized.
Figure 9:
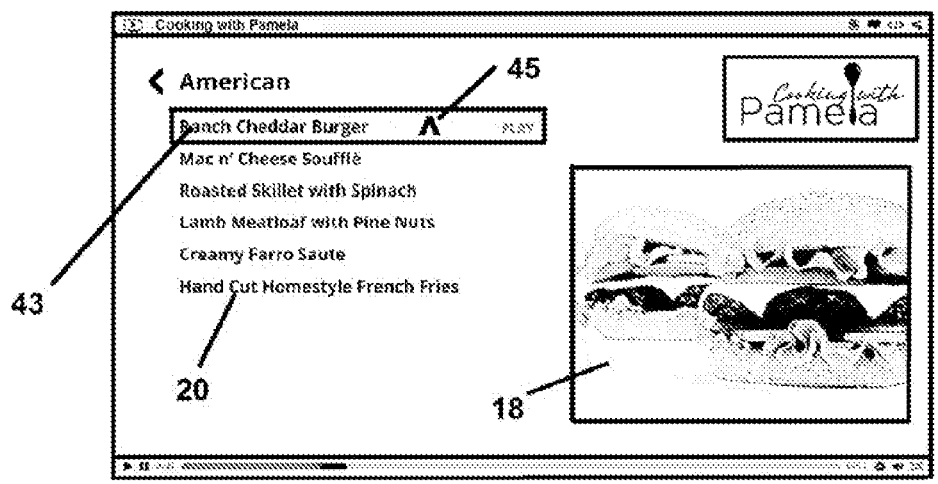
FIG. 9 depicts a graphic interface sub menu for the browser of FIG. 7 showing the listing of media in the chosen English channel and a media window depicting the media for the chosen subject matter from the menu.
Figure 10:
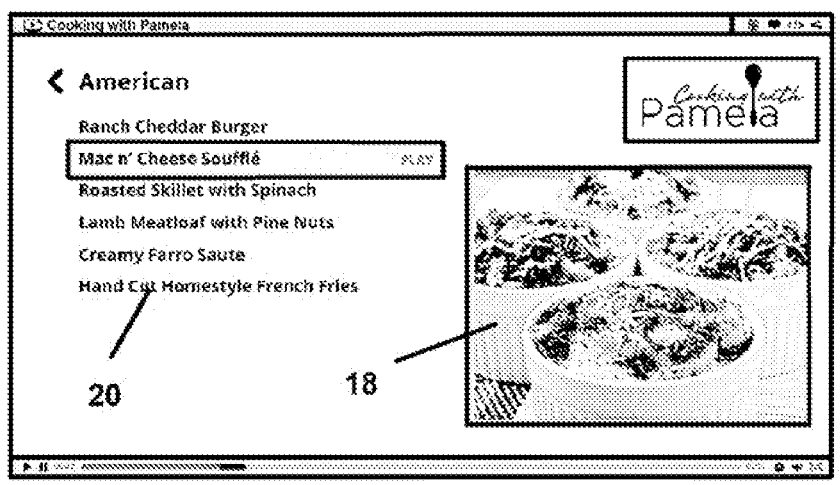
FIG. 10 depicts the media browser window with displaying a graphic depiction of a second chosen subject from the graphic interface men of FIG. 9.

Thereafter the user 26 employs the icon such as in FIG. 5 to activate the main menu pages of the media browser 16 shown in FIGS. 5 and 6. Thereafter the user 26 may use the graphic interface to achieve listings of the available channels, shown in FIG. 8, and sub categories shown in FIGS. 9 and 10 to choose which media files the user 26 wishes to requests for play 36 on their local computing device 31. This can easily be accommodated by allowing the user 26 to employ the communicated media browser 16 as a graphic interface 38 menu and allow the user 26 to browse the categories and underlying related media files and thereby use the cursor or other video display-based means for choice to choose the media they wish to view.

Additionally, either upon loading the media browser 16 for operation on the local user 26 computing device 24, or once the user 26 communicates their choices of channels or categories and underlying populated media files, using software adapted to the task, the local machine configuration which includes surveyed media playing capabilities, are communicated to a remote server in communication with such media browser 16 software. Upon such communication of the local access point or computer device 24 configuration for media playing capabilities and criteria, using software and the database 23 adapted to the task, the communicating server 34 assigns or identifies the unique local computing device identifier 31 for the local computing device 24, and employs the ascertained computing device 24 configuration for media playing capabilities associated with the identified computing device identifier 31, as a means for determining the required one or plurality of digital files to place in communication with the remote user computing device 24, for the configuration and as related to the media browser 16 unique browser identifier 30.

The identified digital files related to grouped files 29 of the originally populated media identified media browser 16, will then be communicated to the local user computing device 24 in a digital format which can be employed on the requesting user's computing device. Any additional digital media files, software or codecs and the like needed for the identified configuration 32 of media display and audio on the local machine are also associated to that uniquely identified local machine as a group of files, and communicated thereto.

Communication of the ascertained type and group of media files can be accomplished by allowing a communication and/or download of the media files to storage on the user's computing device 24 from the server 34 or from a cloud server, or by streaming the media files to the user computing device 24 from the hosting server, or in another fashion allowing the user 26 to view the desired and requested media files on their local computing device.

In any case, the user computing device identifier 31 and the uniquely identified individual media browser 16 or browsers loaded thereon, are associated in the database 23 stored and used by the system 10 herein. Thereafter, when a media file request is received from an identified media browser 16 on the user computing device 24 bearing the unique computing device identifier 31, a lookup in the database 23 of unique browser identifiers 30 will associate the user local computing device 24 with the stored local computing device identifier 31 containing its configuration and ascertain the proper format and/or media file configuration and grouping to communicate to the local user computing device 24 to properly operate to play the media thereon.

In an optional but preferred mode of the system 10, the communicated media browsers 16 will be made freely electronically communicable to other users, as a means for sharing or syndication of the media browser 16 and its populated media content. Communication of the media browser 16 with its unique browser identifier 30, may be handled by the originating user or client subscriber or a downstream user 26 in conventional fashion by attachment to email, posting for download on a website, or other means for electronically communicating the media browser 16 to third parties.

Upon receipt by the subsequent user 26, software adapted to the task, as with the first user's computing device 24, will poll the new computing device 24 location to ascertain a change of operational venue. This can be done by polling the computer for a Mac ID of the network card, and local IP address, to ascertain if a match to the original machine location exits or not. If not, the software employed with the media browser 16 will again ascertain the local machine configuration by a polling of the electronic equipment and software onboard the new computing device 24, and communicate the configuration along with the information that the media browser 16 is in a new location.

The software running on or in conjunction with the server 34 will discern a new access point and assign a new user computing device identifier 31, associated on the database 23 with the new user computing device 24, and will also store the configuration thereof in relation to the digital file requirements for any media requests from the uniquely identified media browser 16 with the new local machine or computing device identifier 31. Thereafter the media browser 16 upon activation to play media from the deployed graphic interface, will either employ the digital files communicated to and stored on that local machine, or will communicate with the server to be placed in a communication with the media files in the proper format for local media play. Media browsers 16 can be communicated with full, limited, or no administrative rights to change the populated media files related thereto. With administrative rights, a downstream or receiving user 26, can change or add media files to the population of the media browser 16 whereupon it will be provided with a new media browser identifier 30 by the system 10 which will be related in the database to the user 26 as the populating user or as also used herein the subscribing client 27.

Figure 2:
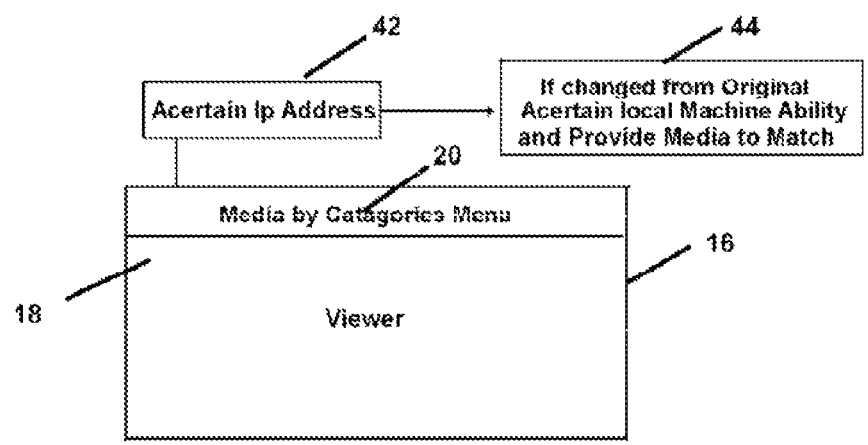

As shown in FIG. 2, with user-distribution option enabled, the media browser 16 employing software adapted to the task to ascertain if it's in a new location will activate. As noted location can be determined by software using electronic means such as by identifying the local IP address 42, or the machine MAC ID on the local computing machine's network card, or both, and compare the identified information against stored information of the local machine the media browser 16 occupied previously. Upon discerning a new location, as also noted, local electronic equipment and playback capabilities and requirements will be discerned and the local machine configuration 32, and identifier 31, are determined and stored in the database 23 use to determine the grouped files 29 for the media populated with the proper digital files in the proper format for the software discerned configuration for communication to the local computing device 24.

Figure 3:
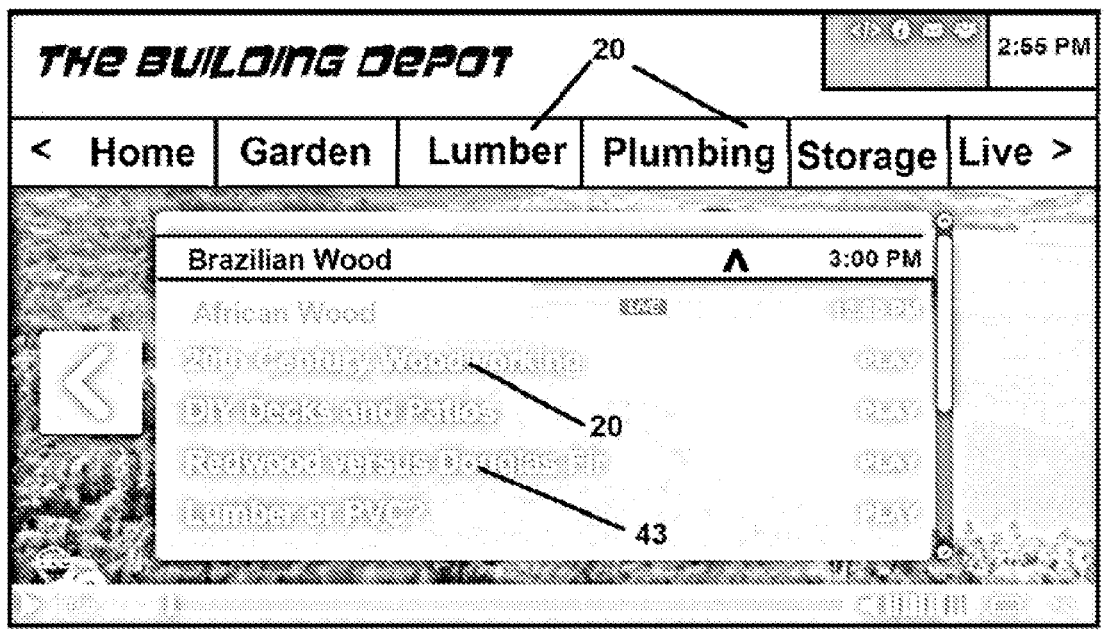
FIG. 3 depicts a media browser exemplar showing media categories and subject matter menu page.
Figure 4:
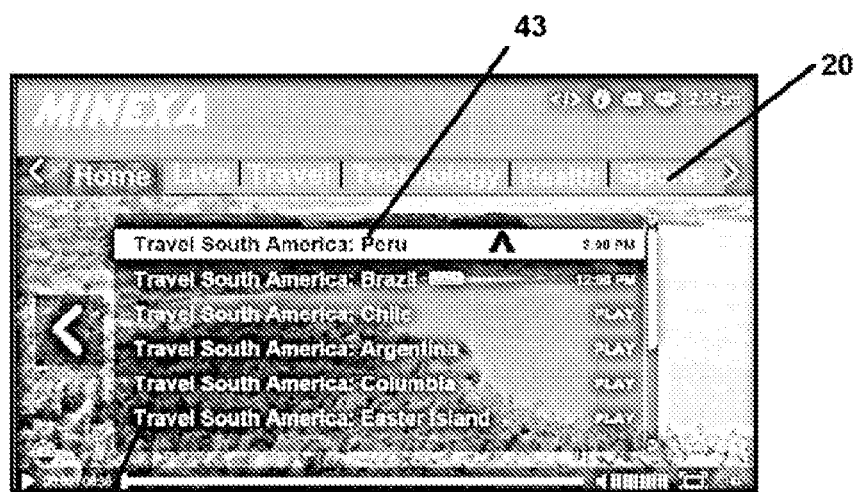
FIG. 4 shows the categorization of the provided browsers as in FIG. 5 which can be used for inventorying media or sending such in populated media browsers for associated media files playable under the categories.

The media browser 16, if administrative rights are granted, may be configured with employing software adapted to the task, to allow the user 26 receiving it to customize it by changing one or both of the graphic display area shown as virtual display screen 18 in FIG. 3 and/or the graphic display area or the graphic interface 38 menu, and/or the populated media files. Using a graphic interface such as provided as part of or for use with the WINDOWS or ANDROID operating systems, and configuring the media browser 16 to allow such changes will allow users to mold or meld the media browsers 16 to their personal likes.

Once the IP address of the local user computing device 24 the media browser 16 occupies is discerned, the system server 34 employing software adapted to the task can tailor and restrict access to populated media files based on the discerned IP address, and the particular computing device identifier 31 of the determined access point or local user computer that is running the identified media browser 16 for media a viewing. In addition to the provision of media files solely related to the media browser identifier 30, of the individual media browser 16, and such local media operational information may be stored in the database 23 and employed in communications subsequent to communicating the proper grouped digital media files 29 relating to the subscribing client 27 product or service or information, to which the browser identifier 30 of the media browser 16 relates. With local playback configuration 32 known, and electronic communication possible, and with the unique identifier of the media browser 16 and its product or service relation, digital files for products and service of other advertisers or sellers or third parties may be communicated to or offered to the local user 26. Or, restrictions on media play of communicated digital media files may be initiated.

This process may be employed for example, to manage content rights of the media which may be territory-specific. Or, perhaps the media being communicated to the media browser 16 concerns a particular retailer with many local stores. Employing software adapted to the task and running on or in conjunction with the server 34, the local computing device's 24 geographic location can ascertain and the communicated media digital files may be tailored to the local user 26 at the IP address identified new location and local sellers of the product or service of the original subscribing client 27.

If the access to the media browser 16 has been moved to a new machine, for instance with access to or the media browser itself by being sent by one person to a friend or relative user 26, as noted, such can be discerned by the IP address and/or a MacID on the network card of the local machine and the local user computing device identifier 31 being matched with the browser identifier 30 assigned the media browser 16. As noted above, the media browser identifier 30 serves to identify which populated media files are related thereto and which grouped media files 29 are communicated to it, for which subscribing client 27 interest, media bent, website, video, product, service or digitally communicative information, is communicated to be populated to and run with each individual media browser 16. All subsequent downstream new users 26 would initially have access solely to the grouped media files 29 related to populated media relating to the browser identifier 30. However, as noted, if administrative rights allowing changes are also communicated or allowed, each subsequent user 26 can change such wherein it the media browser 16 would be given a new browser identifier 30 relating to the new user 26 as the subscribing client. When the media browser 16 is operated on a subsequent computing device 24, as noted it will be surveyed and have its location and operational configuration stored in the database 23 so as to tailor the digital files for the populated media to be grouped and sent to the local user computing device 24.

The ability for users to electronically forward the media browser 16, which is associated with the originally populated media and related grouped media files 29 of the originating user or subscribing client's 27, provides significant improvement to the unorganized fashion at present. Enabling the populated media files on reaching a user 26 using the media browser 16 to be made available in a categorized fashion based upon the media browser identifier 30, and having software adapted to self-ascertain a media browser's new location and local computing device abilities, is a significant step forward in ongoing distribution of a subscribing client's 27 products and services and information. This is because many users and groups have common interests and may use social networks.

Further, the provision of such media browsers 16 to users 26 for self-use to enable the orderly inventorying of media files on their own computing devices, is a significant improvement to the current mode where website address may be stored in a browser, and photos is a file folder, and videos in another folder, and documents in another. Employing a media browser 16 herein, with its unique identifier relating to the media files, documents, information, websites, videos, songs, and any other information, allows an originating user 26 a single point of interface to find any such information, easily using a categorized graphic interface, and be immediately connected to the piece of information desired. Further, because the media browser 16 related to the originating user 26 can be stored and accessed from a networked server, the user 26 has the same organized categorized access to all the information from any computing device. This would allow for example an attorney to input as populated media to a media browser 16, photos, videos, websites, documents, court documents, and all media files relevant to a particular matter, accessible using the media browser 16 as a graphic interface and inventorying system. If an associate needed to join the case, access to the media browser 16 can be provided and the subsequent user associate would have the same categorized organizer system and graphic interface means of access to all the populated media related to the individual media browser 16 by the database of the system 10.

An alternative example is that of a young adult who can use a media browser 16 with its associated identifier related by the database 23 of the system 10 to videos on UTUBE and pages on FACEBOOK and MP3 audio music on multiple websites. Again by populating the identifiable media browser 16 with the media files above, the organized categorized graphic interface provides the user 26 with easy access and organization and the media browser 16 if hosted on a network accessible server 23 is employable from multiple computing devices and locales. The populated media files can be sent to a friend user 26 who will have the same organized access to the same populated media files and locales as the first user 26. The downstream friend user 26 if provided with administrative rights, can add to the populated media files or subtract therefrom, and then be given their own browser identifier 30 for what has become their own media browser 16 organizer.

Thus users 26 will freely forward the media browsers 16 which be populated with specific media files of the originator, and which in most case will be related to their common interests, to like-minded users 26 who will appreciate the highly specific information included in the populated media files, and associated with the individual media browser 16 by the system 10. Users 26 will thus be more likely to order forward the media browser 16 to others of similar interests. Once forwarded to a new machine, the new user 26 is provided with access to the same populated media files the media browser 16 associated through the browser identifier 31 in the database 23, and the subsequent or new user 26 is either identified as currently in the database 23, or a new user identifier 21 record is placed in the database 23 in combination with a new user computing device identifier 31 of the local computing device 24 or access point on which the media browser 16 operates.

When it is determined a media browser 16 has changed locations, the provided grouped media files 29 communicated to the subsequent user 26, while being the same subject matter as the prior user 26, since each media browser 16 has an identifier 30 which is associated in the database 23 with a particular product or service or information of a subscribing client 27, will be adapted for run on their local machine. Once the local computing device 24 is surveyed or inventoried by software adapted to the task for its configuration, a unique computing device identifier 31 of that particular computing device 24 is associated with the computing device identifier 31 of the user computer, and with the identifier 30 of the media browser 16, and thereafter media files for the media browser 16 matched to the local capability are only provided.

By standardizing the media provided and related to any individual media browser 16, and relating the media browsers 16 to user local computing devices 24 and their required digital file format and grouping, much more accurate user 26 information is generated than by conventional simple tracking website visited. Consequently limiting viewable media on each uniquely identified media browser 16, to one purveyor or product provides valuable user data in the area of data/metrics.

The system herein, also provides user-specific relational information concerning what video a user 26 watched on the uniquely identified computing device 24, what friends were forwarded that specific media and if they viewed it, and what specific subject and audio or visual media files were included or communicated to the specific media browsers requested or watched. Thus by limiting the media files each media browser plays, and by tracking each individual user 26 by their local computing device identifiers 31, in the database 23 which maintains current and past listings of media browsers 16 requested and watched by each user 26, the system herein yields relational data on internet users 26 which is highly specific on their current interests. Such may be provided to subscribing clients 27 as a means to determine what media to push or send to a user 26 with concern to, or related to their respective products or services.

For commercial concerns, rather than guess why the users 26 visited a website in sending them advertisements, the system herein using highly product specific media browsers 16 with limited products and services viewable thereon, can target tracked users 26 for upcoming purchases much more accurately for advertisers. This tracking information may be enhanced by inclusion of a tracking cookie with requested or forwarded media browsers 16 which would render reports on which media browsers 16 or what plurality of media browsers a user 26 has received and watched.

While all of the fundamental characteristics and features of the browser-based media communication system herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that upon reading this disclosure and becoming aware of the disclosed novel and useful system, various substitutions, modifications, and variations may occur to and be made by those skilled in the art without departing from the spirit or scope of the invention. Consequently, all such modifications and variations and substitutions, as would occur to those skilled in the art are considered included within the scope of the invention as defined by the following claims.

What is claimed is:

1. A method for communicating electronic media, between users, comprising the steps of:
    providing access to media browsers from a server which is accessible by a user over a computer network;
    assigning a unique browser identifier relating to each respective subscribing client of a plurality of subscribing clients, to each said media browser;
    having each respective said subscribing client designate a file population group including one or a plurality of media files, for use with a single said media browser assigned a said unique browser identifier respectively relating to said subscribing client;
    allowing a user having a computing device communicating with said network, to choose a respective said media browser;
    employing software configured to the task of determining a configuration of said computing device employed by said user;

using said configuration to ascertain an operative format of said media files to provide to said computing device employed by said user which enable said media browser chosen by said user to generate said media on said computing device employed by said user;

assigning each respective said computing device employed by a said user, a unique computing device identifier associated with said configuration;

storing a relation in said database, between each respective said user identifier and a respective said computing device identifier;

providing access to said user to said media files in a respective said file population group designated for use, with said media browser chosen by said user;

providing access to said user to employ said media browser chosen by said user, to populate said media browser chosen by said user, solely with media files in said file population group designated for use with said media browser chosen by said user.

2. A method for communicating electronic media of claim 1 additionally comprising:

obtaining user information from each said user and assigning each said user a user identifier; and storing a first relation in a database, between each respective said user identifier and a respective media browser identifier of each respective said media browser chosen by said user.

3. The method for storing and providing electronic media of claim 2 additionally comprising:

employing said first relation to provide a respective said client subscriber who is associated with a respective said browser identifier, with said user information of respective said users accessing said media browser with said respective browser identifier associated with said respective client subscriber.

* * * * *